United States Patent
Prabhakar et al.

(10) Patent No.: US 10,893,559 B2
(45) Date of Patent: Jan. 12, 2021

(54) FREQUENCY SELECTION DURING ACTIVITY

(71) Applicant: APPLE INC., Cupertino, CA (US)

(72) Inventors: Alosious Pradeep Prabhakar, Singapore (SG); Rodney Ibrahim, Sydney (AU); Mohammed Sadique, Sydney (AU); Vijay Venkataraman, San Jose, CA (US); Bilal Zafar, Tokyo (JP)

(73) Assignee: Apple Inc., Cupertino, CA (US)

( * ) Notice: Subject to any disclaimer, the term of this patent is extended or adjusted under 35 U.S.C. 154(b) by 149 days.

(21) Appl. No.: 15/970,196

(22) Filed: May 3, 2018

(65) Prior Publication Data

US 2019/0342931 A1    Nov. 7, 2019

(51) Int. Cl.
*H04W 76/15* (2018.01)
*H04B 7/155* (2006.01)
*H04W 72/10* (2009.01)
*H04W 72/04* (2009.01)

(52) U.S. Cl.
CPC ........ *H04W 76/15* (2018.02); *H04B 7/15528* (2013.01); *H04W 72/0453* (2013.01); *H04W 72/10* (2013.01)

(58) Field of Classification Search
CPC . H04W 76/15; H04W 72/0453; H04W 72/10; H04W 72/02; H04W 16/16; H04W 48/20; H04B 7/15528; H04B 7/15542; H04B 1/005
See application file for complete search history.

(56) References Cited

U.S. PATENT DOCUMENTS

| | | | |
|---|---|---|---|
| 9,668,274 B1* | 5/2017 | Bartlett | H04W 72/1231 |
| 9,706,538 B1* | 7/2017 | Oroskar | H04W 72/0453 |
| 2009/0251321 A1* | 10/2009 | Delorey | G08B 21/088 340/573.6 |
| 2013/0337821 A1* | 12/2013 | Clegg | H04W 16/16 455/452.1 |
| 2017/0013624 A1* | 1/2017 | Hashimoto | H04W 48/20 |

* cited by examiner

*Primary Examiner* — Vinncelas Louis
(74) *Attorney, Agent, or Firm* — Fay Kaplun & Marcin, LLP

(57) ABSTRACT

A device, system, and method select a frequency band during an attenuation activity state. The method is performed at a device that is configured to establish a network connection to a network having a first priority of available frequency bands set by the network. The method includes identifying an attenuation activity state. The method includes generating a second priority of the available frequency bands based on the attenuation activity state. The method includes selecting one of the available frequency bands based on the second priority to establish the network connection.

20 Claims, 3 Drawing Sheets

FREQUENCY SELECTION DURING ACTIVITY

BACKGROUND INFORMATION

A user equipment (UE) may be configured to establish a connection to at least one of a plurality of different networks or types of networks as well as with other UEs to perform a variety of different functionalities via the connection. For example, the UE may connect to a first type of network (e.g., Long Term Evolution (LTE) network) to communicate with another UE through the network connection (e.g., a user of the UE may perform a voice call or transmit a text to another user of another UE). In another example, the UE may connect to a second type of network (e.g., WiFi network) to receive browser data at a higher rate of data exchange. In a further example, the UE may directly connect to a further UE using a short-range communication protocol (e.g., BlueTooth).

When the UE is mobile, the UE may be utilized in various different locations while the user of the UE is performing any of a variety of different activities. For example, the user of the UE may be performing a workout, an exercise, a physical action, etc. (hereinafter collectively referred to as an "activity") while the UE is kept on the person of the user or is worn by the user. The UE may be configured to enable the user to track a progress of performing the activity. For example, the UE may track a distance traveled, a time spent, body measurements, etc. However, during the activity, the UE may be exposed to conditions that attenuate the connection with the various networks (e.g., experience signal loss). For example, the UE may have an increased mobility, may be located within an indoor facility, may be disposed in a liquid environment for a prolonged period (e.g., while scuba or snorkeling) or for intermittent periods (e.g., during strokes while swimming), etc. The UE may perform a variety of operations to compensate for the attenuation which may lead to adverse outcomes, increased usage of a limited power supply, and a poor user experience.

SUMMARY

The exemplary embodiments are directed to a method for selecting a frequency band during an attenuation activity state. The method is performed at a device that is configured to establish a network connection to a network having a first priority of available frequency bands set by the network. The method includes identifying an attenuation activity state. The method includes generating a second priority of the available frequency bands based on the attenuation activity state. The method includes selecting one of the available frequency bands based on the second priority to establish the network connection.

The exemplary embodiments are directed to a device configured to select a frequency band during an attenuation activity state. The device includes a transceiver configured to establish a connection to a network having a first priority of available frequency bands set by the network. The device includes a processor identifying an attenuation activity state, the processor generating a second priority of the available frequency bands based on the attenuation activity state, the processor selecting one of the available frequency bands based on the second priority to establish the network connection The exemplary embodiments are directed to a device configured to select a frequency band during an attenuation activity state. The device includes first circuitry for establishing a connection to a network having a first priority of available frequency bands set by the network. The device includes second circuitry for identifying an attenuation activity state. The device includes third circuitry for generating a second priority of the available frequency bands based on the attenuation activity state. The device includes fourth circuitry for selecting one of the available frequency bands based on the second priority to establish the network connection.

DETAILED DESCRIPTION

Figure 1:
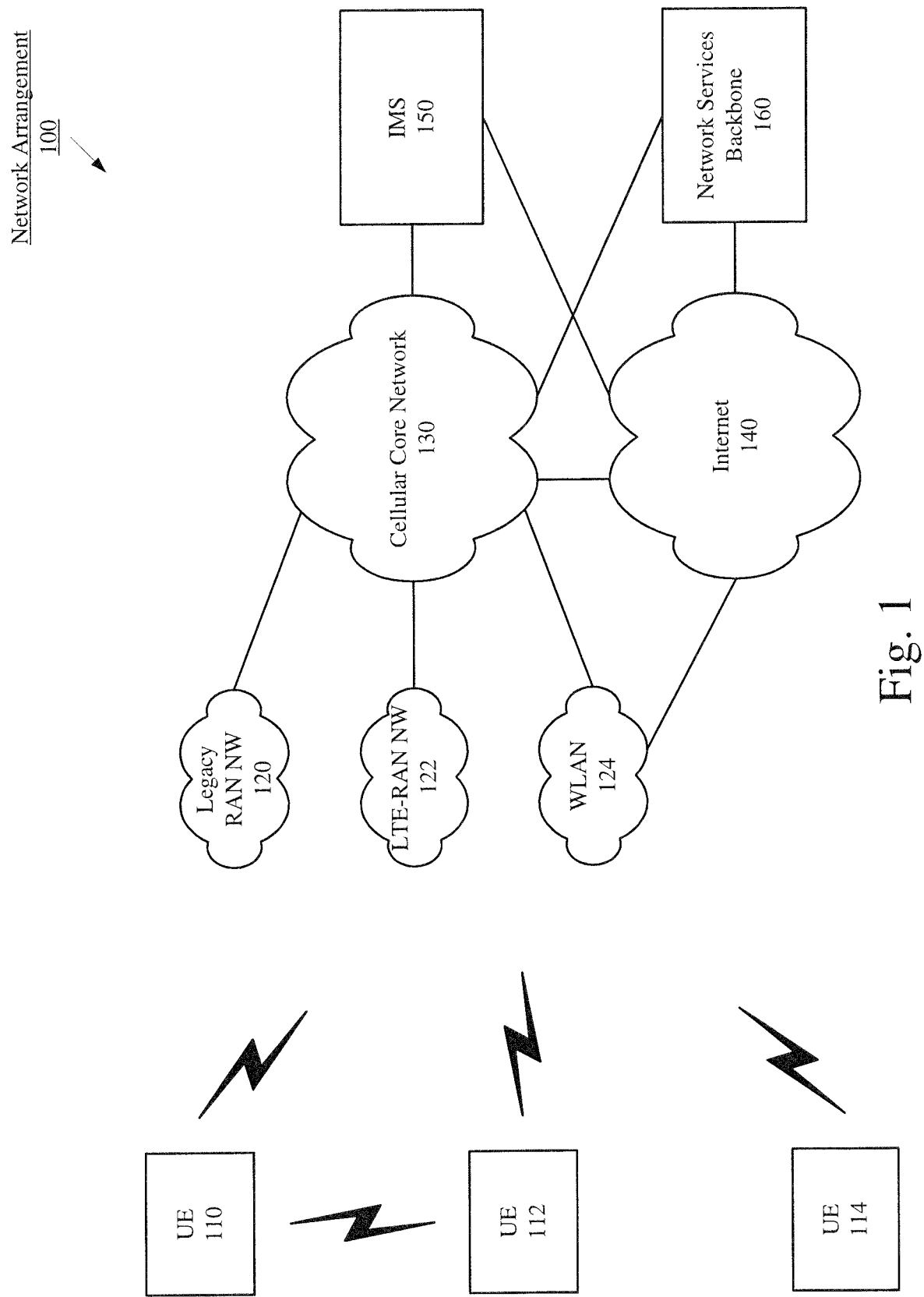
FIG. 1 shows an exemplary network arrangement according to various exemplary embodiments described herein.

The exemplary embodiments may be further understood with reference to the following description and the related appended drawings, wherein like elements are provided with the same reference numerals. The exemplary embodiments are related to a device, system, and method for dynamically determining a priority of available frequency bands of a user equipment (UE) when an attenuation activity associated with an attenuation of a network connection is detected on the UE. While the user is performing the attenuation activity, the UE may be exposed to an environment where one or more factors attenuate the network connection such as increased signal loss which leads to a poor network service. Specifically, a network priority of available frequency bands during a time the attenuation activity is not detected may not correspond to improved performance for the network connection during a time the attenuation activity is detected. Accordingly, the exemplary embodiments provide a dynamic mechanism to modify the prioritization of the available frequency bands when the attenuation activity is detected.

As used herein in describing the exemplary embodiments, the UE may be in a non-activity state or an activity state corresponding to whether a user of the UE is performing an activity. The activity may relate to whether the user is performing a physical activity, being at a particular location, a combination thereof, etc. Furthermore, the activity state may include a plurality of activities, a subset of which is attenuation activities. As will be described in further detail below, the attenuation activity may be an activity that causes or has a higher likelihood of causing an attenuation to result on a network connection. That is, the attenuation is directed to the network connection and may include any degradation in the signal or signal quality that may be compensated for using the exemplary embodiments.

Initially, it is noted that the exemplary embodiments are described with regard to a UE. However, the UE is only exemplary. The exemplary embodiments may be utilized with any device that may establish one or more connections as well as one or more types of connections (e.g., to a network, to a device, etc.) as well as be configured with the hardware, software, and/or firmware to establish a connection. Therefore, the UE as described herein is used to represent any device capable of establishing a network connection.

It is also noted that the exemplary embodiments are described to include scenarios in which the UE is an accessory, where the UE and a companion UE may establish a short-range communication pathway (e.g., where the accessory UE is a slave and the companion UE is a master). Accordingly, when the accessory UE and the companion UE are connected to one another over the short-range communication pathway, the accessory UE may receive data via the companion UE while deactivating any network capabilities to a cellular network and/or a WiFi network. When the accessory UE and the companion UE are not connected, the accessory UE may exchange data over any network to which it is configured to connect (instead of through the companion UE). However, the use of the accessory UE and the companion UE is only exemplary. The exemplary embodiments may be utilized for any UE (with or without a companion UE) and represent any device. Furthermore, for illustrative purposes, the exemplary embodiments are described with regard to the UE attempting to establish a connection with a Long Term Evolution (LTE) network. However, those skilled in the art will understand that the exemplary embodiments may also be used for or in combination with connecting to a further UE and any type of network.

It is further noted that the exemplary embodiments are described with regard to the attenuation activity attenuating the network connection because the environment exposes the UE to being submerged in water. However, the scenario where the UE is submerged in water that results in attenuation of the network connection is only exemplary. The exemplary embodiments may be utilized or modified when the UE is in any environment that may result in a network connection being attenuated. Accordingly, the exemplary embodiments may dynamically determine a priority of available frequency bands in different types of environments that cause attenuation of a network connection for respective reasons.

In one example, the UE may be wearable and provide various functionalities and features. For example, the UE may be worn during a workout activity to track a user's health and monitor performance during the workout activity. In another example, the UE may be worn throughout a day to track various health parameters (e.g., calorie burn, steps, etc.). The UE may also be configured with environmental features such as being water resistant (e.g., up to 50 meters). Therefore, the activity may also include water-based activities in which the UE may be submerged in water temporarily, for a prolonged period, for intermittent periods, etc. For example, the UE may be used while swimming in a pool or open water, snorkeling, relaxing in a bathtub, sitting in a sauna or pool, playing water sports, waterskiing, jet skiing, surfing, rowing, rafting, canoeing, etc. Accordingly, the attenuation activity may involve a swim related workout, a non-swim related workout in the presence of water, or not involve a workout in the presence of water.

When the attenuation activity is a water-based activity which subjects the UE to be under water, a network connection using a particular frequency band may encounter signal loss. For example, the attenuation effect may increase for higher frequency bands (e.g., increased signal loss) during the attenuation activity while the UE is submerged. In another example, as the depth increases or as the water becomes different types of solutions (e.g., salt water), the attenuation effect may increase during the attenuation activity while the UE is submerged. These scenarios associated with the attenuation activity may lead to poor network service or out-of-service conditions that result in a poor user experience as well as consume more power (e.g., to scan for other frequency bands).

A conventional mechanism used in establishing a connection, particularly a network connection to a LTE network, is a network lock. That is, when the UE is camped on the LTE network when an attenuation activity is started, the conventional mechanism locks the radio access technology (RAT) to the LTE network. A substantially similar process of locking the RAT may be used for other network types such as a Wideband Code Division Multiple Access (WCDMA) network. However, the conventional mechanism blindly locks the RAT without considering the attenuation of each available frequency band while the attenuation activity is ongoing where the UE may be subject to attenuation of the network connection. In fact, a network priority of the available frequency bands as defined by the network may prioritize higher frequency bands over lower frequency bands. Those skilled in the art will understand that when there is no attenuation activity which subjects the UE to attenuation of the network connection (e.g., the UE remains out of water), higher frequency bands typically experience less interference and enable greater data transmission speeds.

In a particular implementation, a network configuration may include LTE bands 3 and 7 as well as Universal Mobile Telecommunications System (UMTS) bands 1 and 5. With these four bands representing a set of available frequency bands in this implementation, the UMTS band 5 may be the lowest frequency band of these bands. When the attenuation activity is being performed and the UE becomes submerged under water, a lower frequency band may experience less attenuation (e.g., signal loss) than a higher frequency band. Therefore, the UMTS band 5 may suffer less signal loss compared to the LTE bands or the other UMTS band. However, with the conventional mechanism and since there may be a network priority that prioritizes higher frequency bands over lower frequency bands, the UE may lock to a RAT such as the LTE network using LTE band 3 or 7 which results in poor network coverage and service while the UE is under water. However, if the UE had camped on the UMTS band 5 (the lowest available frequency band), the service may have been better.

In view of the above adverse scenarios from the UE experiencing attenuation of a network connection while an attenuation activity is occurring, the exemplary embodiments provide a mechanism that dynamically determines improved performance characteristics of the UE while the UE is under water to provide better network connection service. As will be described in further detail below, the exemplary embodiments determine when the attenuation activity is being performed which results in the UE being disposed in an environment that attenuates the network connection. Thus, when the attenuation activity is being performed, the exemplary embodiments dynamically prioritize available frequency bands to compensate for the attenuation of the network connection so that a frequency band is selected that results in better service or less attenuation.

FIG. 1 shows a network arrangement 100 according to the exemplary embodiments. The network arrangement 100 includes UEs 110-114. Those skilled in the art will understand that the UEs 110-114 may be any type of electronic component that is configured to communicate via a network, e.g., mobile phones, tablet computers, smartphones, phablets, embedded devices, wearable devices, Cat-M devices, Cat-M1 devices, MTC devices, eMTC devices, other types of Internet of Things (IoT) devices etc. It should also be understood that an actual network arrangement may include any number of UEs being used by any number of users and being associated with any number of these users where the user may be associated with one or more of the UEs. That is, the example of three (3) UEs 110-114 is only provided for illustrative purposes.

Each of the UEs 110-114 may be configured to communicate directly with one or more networks. In this example, the networks with which the UEs 110-114 may wirelessly communicate are a legacy radio access network (RAN) 120 (e.g., a 3G network), a LTE RAN (LTE-RAN) 122, and a wireless local area network (WLAN) 124 (e.g., a WiFi network). However, it should be understood that the UEs 110-114 may also communicate with other types of networks (e.g., 5G networks, etc.). With regards to the exemplary embodiments, in a particular implementation, the UEs 110-114 may establish a connection with one or more of the legacy RAN 120, the LTE-RAN 122, and the WLAN 124. For example, the UEs 110-114 may have a legacy chipset, a LTE chipset, and/or a WiFi chipset that are used to communicate with the legacy RAN 120, the LTE-RAN 122, and/or the WLAN 124, respectively. The use of three (3) networks is only exemplary and there may be any other number of networks with which the UEs 110-114 may communicate.

Each of the UEs 110-114 may also be configured to communicate with the other UEs 110-114 without using the networks 120-124. For example, as illustrated, the UE 110 may communicate with the UE 112 using a short-range communication protocol such as BlueTooth. Thus, if the UE 110 and the UE 112 are within a proximity of one another (e.g., within a distance in which BlueTooth communications may be performed), the UE 110 and the UE 112 may exchange data. In a specific exemplary embodiment, if the short-range communication protocol is being used, the UE 110 and the UE 112 may have a companion relationship where the UE 110 is an accessory device and the UE 112 is a source device. Thus, in one manner, the UE 110 may utilize the short-range communication protocol without connecting to any of the networks 120-124 while the UE 112 may connect to one or more of the networks 120-124 and relay data exchanged between the networks 120-124 and the UE 112 to the UE 110 over the short-range communication pathway. However, it is again noted that the use of a companion relationship is only exemplary and the UE 110 may connect to one or more of the networks 120-124 whether or not the UE 110 is within range of communicating with the UE 112 over the short-range communication pathway. For illustrative purposes, it may be assumed that when the UE 110 has established or is attempting to establish a connection to one of the networks 120-124, the UEs in the companion relationship are not utilizing the short-range communication protocol (e.g., separated from one another).

The legacy RAN 120 and the LTE-RAN 122 are portions of cellular networks that may be deployed by cellular providers (e.g., Verizon, AT&T, Sprint, T-Mobile, etc.). These networks 120 and 122 may include, for example, base client stations (Node Bs, eNodeBs, HeNBs, gNBs, etc.) that are configured to send and receive traffic from UEs that are equipped with the appropriate cellular chip set. The WLAN 124 may include any type of wireless local area network (e.g., WiFi, Hot Spot, IEEE 802.11x networks, etc.).

In addition to the networks 120-124, the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UEs 110-114 using the IP protocol. The IMS 150 may communicate with the cellular core network 130 and the Internet 140 to provide the multimedia services to the UEs 110-114. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UEs 110-114 in communication with the various networks. The network services backbone 160 may interact with the UEs 110-114 and/or the networks 120, 122, 124, 130, 140 to provide these extended functionalities.

Figure 2:
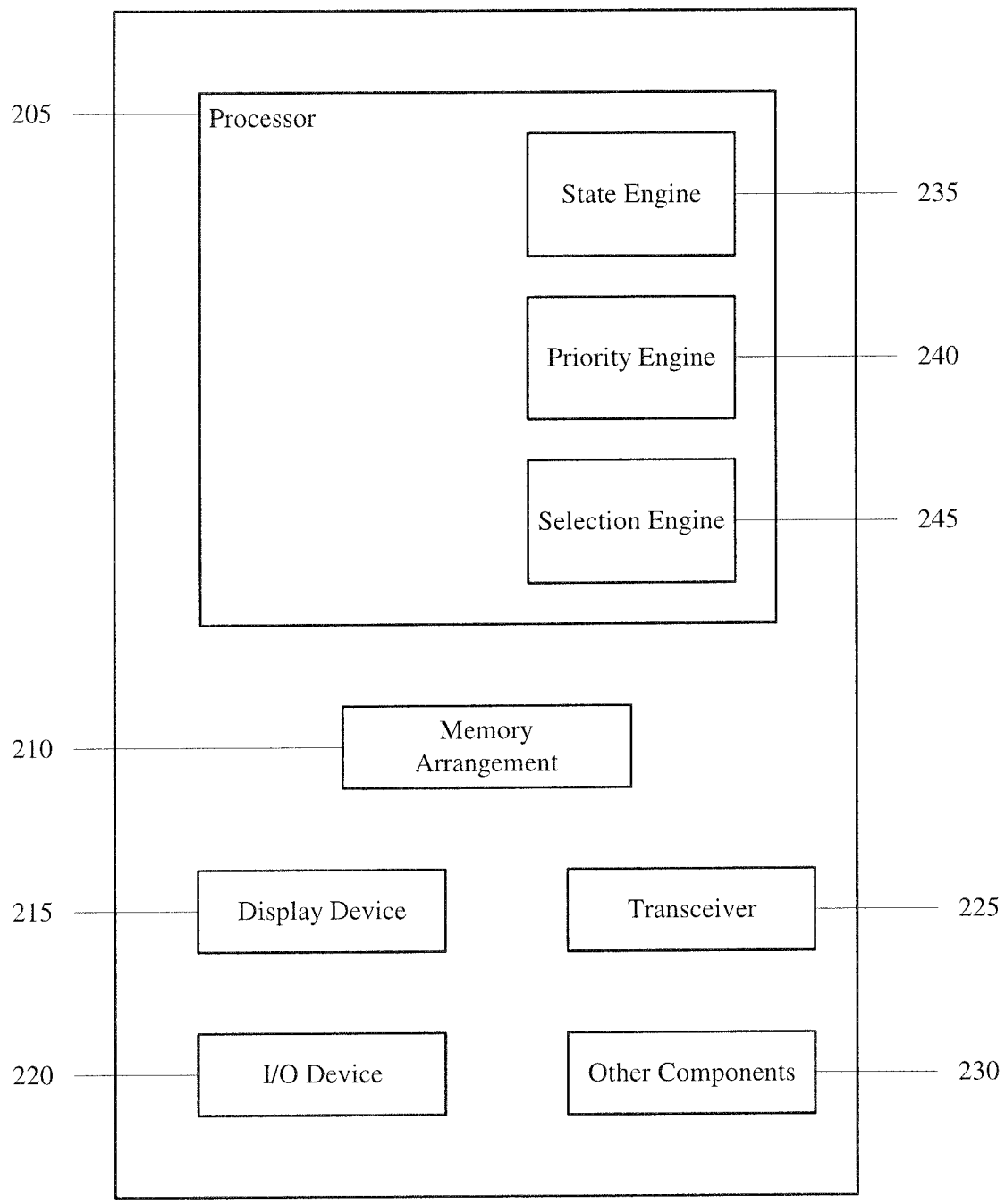
FIG. 2 shows an exemplary user equipment according to various exemplary embodiments described herein.

The exemplary embodiments relate to the UE 110 determining when an attenuation activity is being performed by a user while the UE 110 is with the user (e.g., worn). When the user is performing the attenuation activity that attenuates a network connection, the exemplary embodiments subsequently dynamically prioritize available frequency bands to compensate for the attenuation of the network connection. FIG. 2 shows the UE 110 of the network arrangement 100 of FIG. 1 according to the exemplary embodiments. The UE 110 is configured to execute a plurality of engines that perform functionalities to compensate for the attenuation in the network connection. It is noted that the UE 110 being configured with the features of the exemplary embodiments is only exemplary. That is, the UE 110 may also represent the UEs 112, 114.

The UE 110 may represent any electronic device that is configured to perform wireless functionalities and may be representative of one or more of the UEs 110-114 (examples of which are noted above). The UE 110 may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines of the UE 110. For example, the engines may include a state engine 235, a priority engine 240, and a selection engine 245. The state engine 235 may be configured to determine an attenuation activity state. The attenuation activity state may relate to whether the user of the UE 110 is performing or has concluded an attenuation activity. The priority engine 240 may be configured to define a priority of available frequency bands. The priority engine 240 may also determine or receive information of a cause of the attenuation that provides a further basis upon which the priority is defined. The selection engine 245 may be configured to select a frequency band during a time period that the attenuation activity is performed based on the outputs of the state engine 235 and the priority engine 240.

It should be noted that the above noted engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor, as will be described in further detail below. The exemplary embodiments may be implemented in any of these or other configurations of a UE.

The memory 210 may be a hardware component configured to store data related to operations performed by the UE 110. As will be described in further detail below, the memory 210 may store data associated with available frequency bands (e.g., based on a location of the UE 110) and a network priority as defined by the network to which the UE 110 is connected. The display device 215 may be a hardware component configured to show data to a user while the I/O device 220 may be a hardware component that enables the user to enter inputs. It should be noted that the display device 215 and the I/O device 220 may be separate components or integrated together such as a touchscreen. The transceiver 225 may be a hardware component configured to establish a connection with at least one of a base station associated with the legacy RAN 120, a base station of the LTE-RAN 122 (e.g., an evolved Node B (eNB)), a router of a WLAN 124, the UE 112, etc. Accordingly, the transceiver 225 may operate on a variety of different frequencies or channels (e.g., set of consecutive frequencies). For illustrative purposes, as noted above, the exemplary embodiments are described with regard to available frequency bands in the LTE-RAN 122 to which the UE 110 may establish a connection. However, the exemplary embodiments may be configured to also prioritize frequency bands of other networks (e.g., WCDMA, UMTS, etc.).

As described above, the state engine 235 may determine an attenuation activity state indicating whether the user of the UE 110 is performing the attenuation activity or has concluded the attenuation activity. That is, the state engine 235 may detect when the UE 110 is in an attenuation environment that attenuates a network connection to the LTE-RAN 122. The state engine 235 may be capable of determining the attenuation activity state utilizing a plurality of different mechanisms. As will be described in further detail below, the UE 110 may include applications in which a user manually provides an input indicating an activity condition. The UE 110 may also include further components (e.g., sensors that are included as the other components 130) that are used by the state engine 235 to automatically determine the attenuation activity state.

It may be assumed that when the attenuation activity is detected, the UE 110 is placed in an attenuation environment where there is an attenuation in the network connection. However, the exemplary embodiments may be configured with a redundant status functionality, a confirmation functionality, etc. that determines that the network connection is attenuated. For example, measurements of parameters of the network connection at a time after the attenuation activity is detected may be compared to measurements of parameters of the network connection at a time prior to the attenuation activity being detected. Thus, when the measurements indicate that the network connection is attenuated, the exemplary embodiments may be utilized as described herein.

Initially, as noted above, the exemplary embodiments are directed to an implementation where the attenuation of the network connection is due to the UE 110 being disposed in an attenuation environment while a user is performing an attenuation activity that places the UE 110 under water. According to an exemplary embodiment, an activity condition may be identified as an attenuation activity based on a predetermined probability threshold that the UE 110 becomes submerged in water. For example, the predetermined probability threshold may be 50%. The predetermined probability threshold may also be for a predetermined duration threshold so that instances or moments lasting less than the predetermined duration threshold does not qualify the activity as an attenuation activity. As those skilled in the art will understand, if the UE 110 only incidentally becomes submerged, even at a high probability, the UE 110 may be under water for relatively brief moments that a prioritizing of available frequency bands according to the exemplary embodiment may be an inefficient approach to maintaining a network connection. In this manner, the exemplary embodiments may utilize a probability standard in which to detect a positive attenuation activity state. Therefore, as described herein, a determination that an activity or conditions are indicative of an attenuation activity may include operations that determine the corresponding probability (e.g., in occurrence, in time duration, etc.).

The user may utilize an activity application installed on the UE 110 to manually identify the activity condition. For example, the activity application may include a plurality of features that tracks a progress of an activity being performed. The progress may be for a current activity as well as a historical progress of one or more previous activities. The activity application may be capable of tracking a plurality of different parameters related to the user and/or the activity. For example, in addition to the activity condition, the activity application may track a distance traveled, a time the activity has been performed, a heart rate, a body temperature, etc. It is noted that the attenuation activity state may be based on the activity condition. For example, the activity application may provide a menu including a list of activities. The user may select one of these activities prior to starting the activity. The state engine 235 may be preconfigured so that select ones of the selectable activities are identified as attenuation activities. Therefore, if a user selects an activity that is an attenuation activity, the state engine 235 may positively detect the attenuation activity state.

It is noted that the user may utilize the activity application and enter an input to identify the activity. The user may also manually enter an input indicating a current moment of the activity. For example, the user may initiate, exit, pause, or resume use of the activity application for a selected activity. The UE 110 may also be configured to utilize data/metadata of the activity application to determine the current moment of the activity. However, the exemplary embodiments may focus on whether the UE 110 remains in the attenuation environment where a probability exists that the network connection is attenuated. Therefore, an instantaneous activity condition corresponding to a negative attenuation activity state may be omitted from consideration since the UE 110 may still be disposed in the attenuation environment. Accordingly, the state engine 235 may determine the attenuation activity state over a period of time instead of at individual moments. In this manner, the state engine 235 may determine when the activity is started or ended where a prolonged pause (e.g., beyond a predetermined threshold time duration) may constructively be considered an end and start as well. The state engine 235 may also utilize further available information to determine whether the attenuation activity state is to be updated. For example, location information may confirm whether the attenuation activity state is to be positively maintained or updated negatively. If the UE 110 determines that the activity has stopped (even temporarily), the state engine 235 may determine that the activity was only paused (e.g., less than the predetermined threshold time duration) and still positively detect the attenuation activity state if the location remains substantially unchanged in an attenuation environment (e.g., the UE 110 remains near a body of water, near a pool in a house, etc.).

As noted above, the activity condition may be also automatically identified using any of a variety of other manners based on available technologies on the UE 110 (e.g., when a manual input is not available). In a first example, the state engine 235 may perform an implicit detection of when an activity starts/ends based on metrics measured by a cellular baseband. For example, the metrics may include measurements in a predetermined time interval (e.g., N seconds) where the measurements may include a receiving channel signal variation/stabilization (e.g., received signal received power (RSRP) in LTE, a received signal code power (RSCP) in WCDMA, etc.), a number of OOS events, a number of RLFs, a number of intra- and inter-system selections/re-selections, a number of inter-RAT ping pongs, signal variations above a specified delta, etc. The state engine 235 may identify patterns in these metrics to determine when the UE 110 is with a user performing an activity. More specifically, the state engine 235 may determine whether the activity being performed is an attenuation activity. For example, when the number of OOS events exceeds a predetermined threshold within the predetermined time interval, the state engine 235 may determine that an activity is being performed. Using a further predetermined threshold within the predetermined time interval (e.g., that is greater than the predetermined threshold used to identify the activity), the state engine 235 may determine that the activity is an attenuation activity. The patterns may be different for different activities and the state engine 235 may be configured to dynamically determine the pattern for the different activity types (e.g., based on historical measurement information) and the different attenuation activities. Accordingly, each of the metrics may have corresponding thresholds for corresponding activity and attenuation activity types.

In using these metrics, the activity condition and the attenuation activity state may be determined to be that the user is performing the attenuation activity. For example, it may be that each of a combination of the metrics satisfies the respective threshold. The combination may include the number of RLFs, the number of OOS events, the number of cell (re)selections, the number of signal variations, and the number of inter-RAT ping pongs. When all of these metrics satisfy their respective thresholds, the state engine 235 may determine that the activity is not being performed. For example, the user may be in a non-activity state, the user may intend to start the activity but has not yet started performing the activity, the user has paused performing the activity, etc. However, if any one (or more) of the above metrics in the combination does not satisfy the respective threshold, the state engine 235 may determine that the user is performing the activity. In fact, if the one or more of the above metrics in the combination does not satisfy the respective further threshold, the state engine 235 may determine that the user is performing the attenuation activity. It is noted that the use of a combination of metrics is only exemplary. According to further exemplary embodiments, the state engine 235 may be implemented with any different set of metrics in the combination, use any one individual metric, etc.

In a second example, the UE 110 may include a further component that provides information related to activities performed by the user of the UE 110. For example, the UE 110 may include a motion co-processor that detects specific activities. The motion co-processor may detect hand movements for different swim strokes while a user is swimming. The state engine 235 may receive the information from the motion co-processor and determine that the activity is being performed by the user and that the activity is an attenuation activity. This scenario may be related to when the UE 110 is a wearable device and worn on the user's wrist/hand. In another example, the UE 110 may include a sensor configured to detect respective conditions related to an environment of the UE 110, the body of the user, a disposition of the UE 110, etc. The sensor may be a water monitor, a heart rate detector, a location application (e.g., GPS), etc. These sensors may have specific patterns in their output for different types of activities (e.g., sensing a sub-merging in water, detecting an increase/decrease to heart rate, an identification of a location or change in location over time such as a circular path while running or back and forth while swimming, etc.). The sensors may detect the activity condition when the user engages in a given activity without explicitly initiating an activity application or providing an input on the activity application. Using the identified activity condition, the state engine 235 may determine whether the activity is an attenuation activity.

It is noted that the manual and automated approaches may result in conflicting activities being determined, especially when more than one of the above mechanisms is being used concurrently to determine the user performing an activity. For example, a first activity application may identify pool swimming while a second activity application may identify outdoor walking. The state engine 235 may be configured in a manual or automated way to prioritize the inputs from the various sources of the mechanisms to determine the activity condition to determine the attenuation activity state. Thus, when conflicting activities are determined, the state engine 235 may select and/or ignore certain inputs.

When the state engine 235 has negatively identified an attenuation activity state, the UE 110 may utilize a network priority of available frequency bands as defined by the LTE network. However, when the state engine 235 has positively identified an attenuation activity state, the exemplary embodiments include subsequent operations to compensate for attenuation on a LTE network connection. Specifically, the priority engine 240 may define a priority of available frequency bands. The priority engine 240 may also determine or receive information of a cause of the attenuation that provides a further basis upon which the priority is defined. As noted above, the exemplary embodiments are described with regard to the UE 110 being in an attenuation environment while the user of the UE 110 performs an attenuation activity where the UE 110 may become submerged in water. Thus, the cause of the attenuation may be that the UE 110 is not communicating with the network where signals travel only through air but also travel through water. In this manner, the medium through which the signals travel may be the cause of the attenuation. In other mediums corresponding to other attenuation environments and attenuation activities (e.g., different liquid environments, different density gaseous environments, etc.), the exemplary embodiments may also be configured to determine the priority of available frequency bands corresponding to these mediums.

In defining the priority of the available frequency bands, the priority engine 240 may initially identify the available frequency bands. The priority engine 240 may determine the available frequency bands in a variety of manners. In a first example, the priority engine 240 may receive the network priority of available frequency bands as defined by the LTE-RAN 122 to which the UE 110 is connected. For example, the network priority may include priority band information that is typically sent with network information such as in System Information Blocks (SIB) or SIB5. The network priority may include the available frequency bands. Thus, the priority engine 240 may extract the available frequency bands from the network priority to be used in the priority according to the exemplary embodiments. In a second example, the priority engine 240 may perform network measurements and corresponding operations to identify the available frequency bands as those skilled in the art will understand. In a third example, the priority engine 240 may utilize a combination of the above examples. For example, for any of a variety of reasons, the network may have not included or omitted a frequency band from the network priority. However, through other available information, the frequency band that was not included may be detected and included for consideration. Thus, the UE 110 may be configured to consider one or more frequency bands beyond what is indicated in the network priority.

The priority engine 240 may generate the priority according to the exemplary embodiments based on the available frequency bands. Specifically, in the implementation related to the UE 110 being submerged in water, low frequency bands may experience less attenuation than high frequency bands. In contrast, high frequency bands may be more efficient and provide better features when signals travel through only air using the corresponding high frequency. Accordingly, the network priority may prioritize the available frequency bands where a highest frequency band has a highest priority and a lowest frequency band has a lowest priority with all other available frequency bands being ordered with higher frequency bands having higher priorities. In contrast, the priority according to the exemplary embodiments may be ordered in a different configuration. For example, the priority according to the exemplary embodiments may prioritize the available frequency bands where a lowest frequency band has a highest priority and a highest frequency band has a lowest priority with all other available frequency bands being ordered with lower frequency bands having higher priorities. As the available frequency bands and the corresponding frequencies may differ based on location and when the functionality of the priority engine 240 is to be used, the UE 110 may perform these operations in a dynamic manner on demand.

Once the priority according to the exemplary embodiments when a positive attenuation activity state is detected, the selection engine 245 may select a frequency band during a time period that the attenuation activity is performed based on this priority. Specifically, the selection engine 245 may determine which of the available frequencies has a highest priority. Again, when the UE 110 becomes submerged under water, lower frequency bands may experience less attenuation. Thus, with the priority according to the exemplary embodiments that prioritizes low frequency bands over high frequency bands, the selection engine 245 may select the lowest frequency band to be used in establishing a connection to the LTE network. When two or more frequency bands have the same priority, the selection engine 245 may utilize a substantially similar operation in selecting the frequency band as when the network priority is used. For example, a random selection may be made. In another example, historical information for the frequency bands may be used to perform a selection. For example, a historical throughput, block error rate (BLER), etc. may be used to determine the frequency band that performs under the current attenuation conditions.

By using the mechanism according to the exemplary embodiments, the available frequency bands for the UE 110 may be prioritized in a dynamic manner in situations where an attenuation activity is performed by a user who has the UE 110 which places the UE 110 in an attenuation environment where a network connection may be attenuated. Accordingly, the UE 110 may be prepared to establish or maintain a connection to the LTE network while the UE 110 is in the attenuation environment. By decreasing a potential attenuation of the network connection through a selection process considering the attenuation environment, signal loss and out of service events may be decreased as well as lowering a power usage from operations being required from relying on the network priority to improve an overall user experience and operation efficiency.

According to a particular implementation and exemplary frequency bands and conditions, the exemplary embodiments may be applied to select and utilize a dynamically determined frequency band. In this implementation, the UE 110 may be assumed to be camped on a first LTE band (e.g., LTE band 7). The network configuration at a location of the UE 110 including the available frequency bands with corresponding priorities (as defined by the LTE-RAN 122 in a network priority) may indicate that the LTE band 7 at a frequency of 2600 MHz has a SIB5 priority set as 7, a LTE band 3 at a frequency of 1800 MHz has a SIB5 priority set as 6, a LTE band 28 at a frequency of 700 MHz has a SIB5 priority set as 5, and a LTE band 40 at a frequency of 2300 MHz has a SIB5 priority set as 6. As per these conditions and network priority set by the LTE-RAN 122, the UE 110 attempts to stay or reselect LTE band 7 at a higher frequency due to the higher priority. Therefore, the LTE band 7 may be used most frequently, the LTE band 3 and 40 may be used at lesser frequency, and the LTE band 28 may be used least frequently.

However, the network priority may not consider an attenuation activity that places the UE 110 in an attenuation environment that attenuates the network connection. For example, LTE band 7 is the highest frequency band and may suffer the most attenuation (e.g., signal loss) when the UE 110 is under water. Accordingly, the LTE band 7 may not be the preferred frequency band to be used while the UE 110 is submerged. In contrast, the LTE band 28 being the lowest frequency band among the available frequency bands may be more suited to provide better cellular coverage and experience less attenuation (and less signal loss).

Under the above noted implementation, the mechanism according to the exemplary embodiments may detect when the attenuation activity is performed. As noted above, the attenuation activity may indicate that the UE 110 is in the attenuation environment. The attenuation activity may be determined in a variety of ways such as from manual inputs (e.g., via an activity application) and automatic determinations (e.g., via sensors). Also noted above, the attenuation activity may be differentiated from other activities based on a probability that the UE 110 becomes submerged in water. The attenuation activity may also be qualified based on an amount of time that the UE 110 becomes submerged or for when the attenuation activity is performed. Thus, when the attenuation activity has been performed for a predetermined duration of time or a time-to-trigger (e.g., 5 seconds), the UE 110 may perform the subsequent operations described above. Specifically, the UE 110 may prioritize the available frequency bands. In this scenario, the UE 110 may identify the available frequency bands as the LTE bands 7, 3, 28, and 40 as indicated in the network priority. Once the available frequency bands are identified, based on the frequency of each frequency band, the UE 110 may re-prioritize the frequency bands. Specifically, the UE 110 may prioritize the low frequency bands over the high frequency bands. Thus, the LTE band 28 may have priority set as 7, the LTE band 3 set as 6, the LTE band 40 set as 5, and the LTE band 7 set as 4.

With the above prioritization when the attenuation activity is detected, the UE 110 may use the LTE band 28 with a highest frequency and establish the connection using this frequency band. The UE 110 may continue to use this prioritization and the lowest frequency band until the attenuation activity has concluded or is not detected for a predetermined duration of time. The predetermined duration of time that concludes the attenuation activity may correspond to the predetermined duration of time that starts the attenuation activity (e.g., a time-to-trigger of 5 seconds). However, this correspondence is only exemplary and the predetermined durations of time may differ with either duration being greater than the other.

The UE 110 may also select further frequency bands as defined by the priority when the attenuation activity is performed when a selected frequency band does not provide a quality that is at least a quality threshold. Upon selecting a frequency band based on the priority when the attenuation activity is performed (e.g., LTE band 28), the UE 110 may perform a subsequent quality measurement for the selected frequency band. For example, the quality measurement may be a reference signal received power (RSRP), a reference signal received quality (RSRQ), a received signal strength indicator (RSSI), a power headroom (PHR), etc. For illustrative purposes, the exemplary embodiments are described with regard to the RSRP. If the RSRP is measured and a corresponding value is at least a quality threshold (e.g., −105 dBm), the UE 110 may continue to use the selected frequency band. However, if the RSRP is measured and a corresponding value is less than the quality threshold, the UE 110 may select another frequency band. In this instance, the UE 110 may select the LTE band 3. The UE 110 may continue to select frequency bands until one having a corresponding value is maintained above the quality threshold (e.g., over a measurement duration of time). The UE 110 may return to the highest priority frequency band when all the frequency bands have been used or when a selected frequency band has been used for at least a predetermined duration of time. The UE 110 may also perform a substantially similar operation when the selected frequency results in an out of service event.

The mechanism according to the exemplary embodiments may also be implemented on the UE 110 to force the UE 110 to reselect to a lower frequency band based on a re-prioritization of available frequency bands when camped on a higher frequency band based on the mode of the UE 110. For example, if the UE 110 is in the idle mode, the UE 110 may decide on re-selections. However, in connected mode, the UE 110 may be required to follow network commands for handover. In another example, if the UE 110 is in the radio resource control (RRC) idle mode and if the UE 110 is camped to a higher frequency band, then the UE 110 may be forced to reselect to a lower frequency band based on a priority when the attenuation activity is performed as described above.

Figure 3:
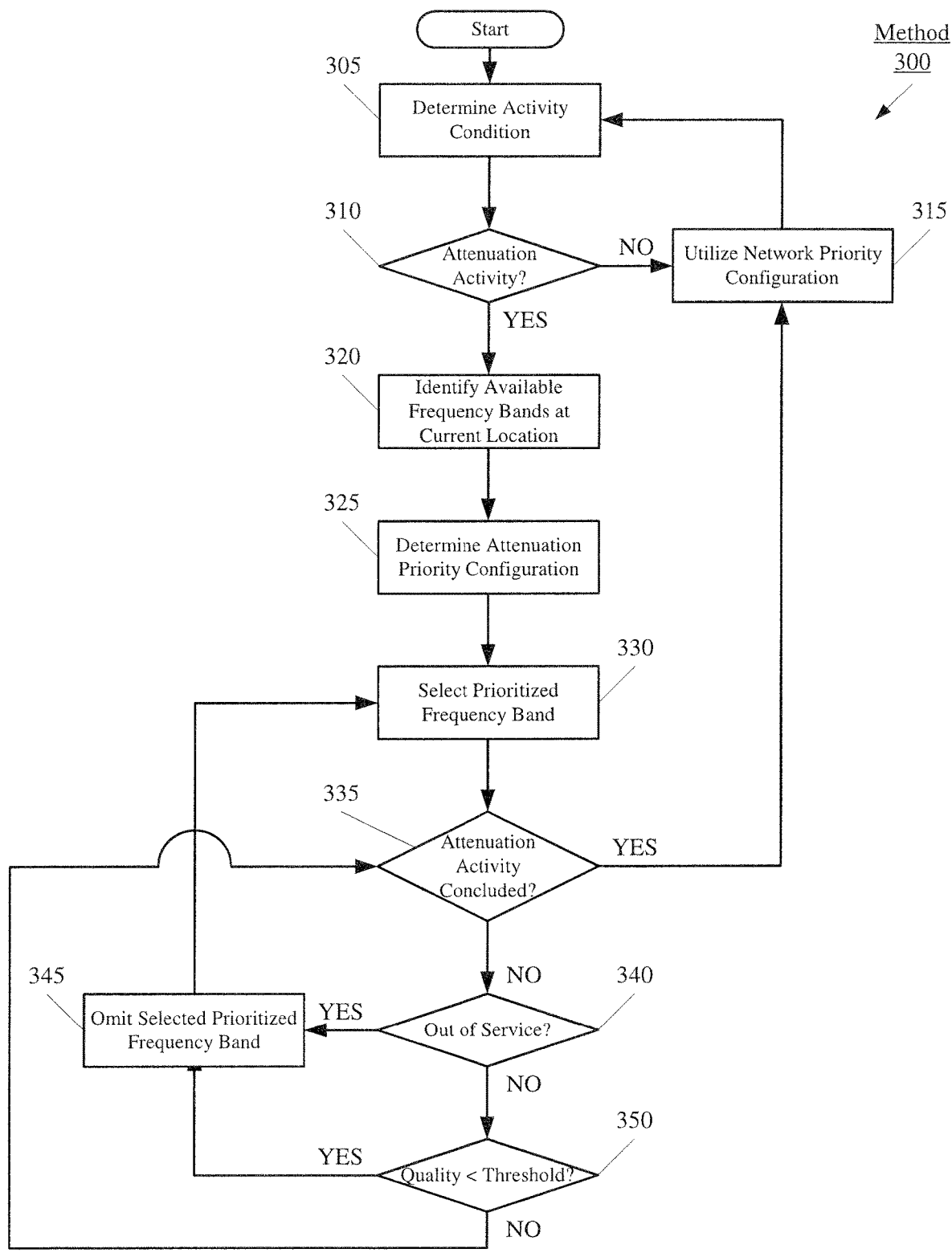
FIG. 3 shows an exemplary method for prioritizing frequency bands during an attenuation activity according to various exemplary embodiments described herein.

FIG. 3 shows a method 300 for prioritizing frequencies during an attenuation activity according to the various exemplary embodiments described herein. The attenuation activity may position the UE 110 in an attenuation environment such that a frequency band on which the UE 110 is currently camped may become less effective or experience signal loss. Thus, the method 300 is configured to utilize a different prioritization of available frequencies to provide a connection for the UE 110 that decreases an attenuation of the network connection (e.g., the signal loss). The method 300 may be performed by the state engine 235, the priority engine 240, and the selection engine 245. The method 300 will be described with regard to the network arrangement 100 of FIG. 1 and the UE 110 of FIG. 2.

In 305, the UE 110 determines an activity condition. As described above, the UE 110 may determine via the state engine 235 a type of activity that is being performed by a user who is in possession of the UE 110 that also exposes the UE 110 to an environment in which the activity is being performed. The environment may include free space (e.g., air) or may include liquid (e.g., water). Since the medium between the UE 110 and the LTE-RAN 122 affect the propagation of signals, the frequency being used may also affect the efficacy of the network connection.

In 310, the UE 110 determines whether the activity condition is an attenuation activity. As described above, the UE 110 may utilize predetermined thresholds and duration thresholds to positively or negatively identify an attenuation activity state. Based on these thresholds, when the UE 110 negatively detects an attenuation activity state (e.g., the UE 110 is in an environment where an attenuation is not due to the medium of the environment), the UE 110 continues to 315 where a network priority of available frequency bands is used to establish and maintain a network connection. For example, the network priority may prioritize high frequency bands over low frequency bands. However, when the UE 110 positively detects an attenuation activity state (e.g., the UE 110 is in an attenuation environment where the UE 110 may be submerged in water), the UE 110 continues to 320.

In 320, the UE 110 identifies available frequency bands where the UE 110 is located. The available frequency bands may be identified based on the network priority received from the LTE-RAN 122 that indicates priorities of frequency bands. Thus, the frequency bands included in the network priority may be indicative of the available frequency bands. The UE 110 may also utilize other information (e.g., network measurements) to identify available frequency bands.

In 325, the UE 110 determines a priority when the attenuation activity is being performed. Based on the attenuation environment and the medium through which signals are to be propagated, the UE 110 may prioritize the available frequency bands to compensate for attenuation of the network connection. Thus, when the medium of the attenuation environment is liquid (e.g., water), the UE 110 may re-prioritize the available frequency bands where a lowest frequency band has a highest priority and a highest frequency band has a lowest priority with intermediary frequency bands prioritized from lower to higher. Based on the priority when the attenuation activity is being performed, in 330, the UE 110 selects a frequency band and establishes/maintains a network connection using the selected frequency.

In 335, the UE 110 determines whether the attenuation activity has concluded or has stopped for a predetermined amount of time (e.g., 5 seconds). If the attenuation activity is not being performed, the UE 110 returns to 315 where the network priority is again enforced and used to establish/maintain the network connection.

If the attenuation activity is still ongoing, in 340, the UE 110 determines if an out of service event has occurred. Those skilled in the art will understand that there may be scenarios where the selected frequency based on the priority when the attenuation activity is performed may result in an out of service event. When an out of service event is detected using the selected frequency band, the UE 110 continues to 345 where the selected frequency band is omitted from consideration. The UE 110 then returns to 330 to select another frequency band based on the priority of when the attenuation activity is performed.

If an out of service event has not occurred, the UE 110 continues from 340 to 350. In 350, the UE 110 determines if a quality is greater than a quality threshold. For example, the UE 110 may measure a RSRP, a RSRQ, a RSSI, etc. to determine whether the quality criteria is satisfied. If the quality of the connection using the selected frequency band is sufficient, the UE 110 returns to 335 where use of the selected frequency band is continued to establish/maintain the network connection and an analysis of the attenuation activity state and quality is continued. However, if the quality of the connection using the selected frequency band is insufficient, the UE 110 continues to 345 to omit the selected frequency band. The UE 110 then returns to 330 to select another frequency band in the priority of when the attenuation activity is being performed.

The exemplary embodiments provide a device, system, and method of prioritizing available frequency bands when an attenuation activity is being performed by a user where a UE possessed by the user is exposed to an attenuation environment where a network connection may be attenuated. Specifically, the attenuation environment may include a water medium through which signals propagate between the network and the UE. As a water medium has different properties than an air medium, the mechanism according to the exemplary embodiments may re-prioritize the available frequency bands to compensate for the attenuation. For example, a network priority may prioritize high frequency bands over low frequency bands. The mechanism according to the exemplary embodiments may generate a priority in which low frequency bands are prioritized over high frequency bands.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made to the present disclosure, without departing from the spirit or the scope of the exemplary embodiments. Thus, it is intended that the present disclosure cover modifications and variations of the exemplary embodiments invention provided they come within the scope of the appended claims and their equivalent.

What is claimed is:

1. A method, comprising:
at a device that is configured to establish a network connection to a network having a first priority of available frequency bands set by the network;
identifying an attenuation activity state based on operations that determine whether the device is or will become submerged in water;
generating a second priority of the available frequency bands based on the attenuation activity state; and
selecting one of the available frequency bands based on the second priority to establish the network connection.

2. The method of claim 1, wherein the attenuation activity state involving submerging the device in water is identified by an automatic determination based on characteristics of the device.

3. The method of claim 1, wherein the first priority prioritizes high frequency bands over low frequency bands, and wherein the second priority prioritizes low frequency bands over high frequency bands.

4. The method of claim 1, further comprising:
identifying the available frequency bands based on one of the first priority, network measurements, or a combination thereof.

5. The method of claim 1, further comprising:
determining when the attenuation activity state has started.

6. The method of claim 5, wherein the determining when the attenuation activity state has started is based on one of a manual input from the user, an automatic determination based on characteristics of the device, or a combination thereof.

7. The method of claim 6, wherein the determining when the attenuation activity state has started is based on whether the attenuation activity state has persisted for a predetermined amount of time.

8. The method of claim 5, further comprising:
determining whether the attenuation activity state has stopped when one of the attenuation activity state has been concluded or the attenuation activity state is not detected for a predetermined duration of time; and
selecting one of the available frequency bands based on the first priority to establish the network connection.

9. The method of claim 1, further comprising:
determining whether an out of service event has occurred using the selected one of the available frequency bands;
when the out of service event has occurred, selecting another one of the available frequency bands based on the second priority to establish the network connection.

10. The method of claim 1, further comprising:
determining whether a quality of the network connection using the selected one of the available frequency bands is above a quality threshold;
when the quality is below the quality threshold, selecting another one of the available frequency bands based on the second priority to establish the network connection.

11. A device, comprising:
a transceiver configured to establish a connection to a network having a first priority of available frequency bands set by the network; and
a processor identifying an attenuation activity state based on operations that determine whether the device is or will become submerged in water, the processor generating a second priority of the available frequency bands based on the attenuation activity state, the processor selecting one of the available frequency bands based on the second priority to establish the network connection.

12. The device of claim 11, wherein the attenuation activity state involving submerging the device in water is identified by an automatic determination based on characteristics of the device.

13. The device of claim 11, wherein the first priority prioritizes high frequency bands over low frequency bands, and wherein the second priority prioritizes low frequency bands over high frequency bands.

14. The device of claim 11, wherein the processor identifies the available frequency bands based on one of the first priority, network measurements, or a combination thereof.

15. The device of claim 11, wherein the processor determines when the attenuation activity state has started.

16. The device of claim 15, wherein the processor determines when the attenuation activity state has started based on one of a manual input from the user, an automatic determination based on characteristics of the device, or a combination thereof.

17. The device of claim 16, wherein the processor determines when the attenuation activity state has started based on whether the attenuation activity state has persisted for a predetermined amount of time.

18. The device of claim 15, wherein the processor determines whether the attenuation activity state has stopped when one of the attenuation activity state has been concluded or the attenuation activity state is not detected for a predetermined duration of time, and wherein the processor selects one of the available frequency bands based on the first priority to establish the network connection.

19. The device of claim 11, wherein the processor determines whether one of an out of service event has occurred using the selected one of the available frequency bands or a quality of the network connection using the selected one of the available frequency bands is above a quality threshold, and wherein, when the out of service event has occurred or when the quality is below the quality threshold, respectively, the processor selects another one of the available frequency bands based on the second priority to establish the network connection.

20. A device, comprising:
first circuitry for establishing a connection to a network having a first priority of available frequency bands set by the network;
second circuitry for identifying an attenuation activity state based on operations that determine whether the device is or will become submerged in water;
third circuitry for generating a second priority of the available frequency bands based on the attenuation activity state; and
fourth circuitry for selecting one of the available frequency bands based on the second priority to establish the network connection.

* * * * *